United States Patent [19]
Soshi et al.

[11] Patent Number: 6,044,231
[45] Date of Patent: Mar. 28, 2000

[54] CAMERA WITH DUAL MODE EXPOSURE CONTROLLED DATA IMPRINTING

[75] Inventors: Isao Soshi; Toshiyuki Nakamura, both of Tokyo; Hidenori Miyamoto, Chiba-ken, all of Japan

[73] Assignee: Nikon Corp., Japan

[21] Appl. No.: 08/188,442

[22] Filed: Jan. 28, 1994

[30] Foreign Application Priority Data

Jan. 28, 1993 [JP] Japan .................................. 5-012897
Jun. 7, 1993 [JP] Japan .................................. 5-136162

[51] Int. Cl.$^7$ .................................................. G03B 17/24
[52] U.S. Cl. ............................................ 396/315; 396/435
[58] Field of Search ................................. 354/105, 106; 396/310, 315, 318, 435, 436

[56] References Cited

U.S. PATENT DOCUMENTS

| | | | |
|---|---|---|---|
| 4,074,294 | 2/1978 | Fujita et al. ............................ | 354/106 |
| 5,245,373 | 9/1993 | Ogawa et al. .......................... | 354/106 |
| 5,319,402 | 6/1994 | Tsujimoto et al. ..................... | 354/106 |
| 5,349,402 | 9/1994 | Soshi et al. ............................ | 354/106 |

FOREIGN PATENT DOCUMENTS

| 5224288 | 9/1993 | Japan .................................. | 354/105 |
|---|---|---|---|

*Primary Examiner*—Safet Metjahic
*Assistant Examiner*—Christopher E. Mahoney
*Attorney, Agent, or Firm*—Morrison Law Firm

[57] ABSTRACT

A camera has a data imprinting device having an optical system focussing light from an LED array on a photographic film at first and second positions corresponding to full-size and panorama-size picture formats. In a first embodiment the optical system has two lens elements, at differing distances from the LED array, each aligned to imprint data at one of the two positions. In a second embodiment the optical system has a single lens element which moves from a first lens position to a second lens position at differing distances from the LED array. Amounts of light emitted by the LED array are modulated by a control system to produce correctly exposed imprinted data at both position. The control system compensates for differing numerical apertures of associated with the first and second positions. The control system also compensates for film speed. One embodiment of the invention modulates the amount of emitted light by adjusting a current level driving the LED array. Another embodiment modulates by pulse width modulating the illumination period of the LED array.

17 Claims, 9 Drawing Sheets

Fig. 2a

CAMERA WITH DUAL MODE EXPOSURE CONTROLLED DATA IMPRINTING

BACKGROUND OF THE INVENTION

The present invention relates to a camera having a dual mode data imprinting device and, more particularly, to a camera with a data imprinting device capable of varying an exposure of imprinted data.

Cameras are available with a feature permitting pictures to be taken with varying aspect ratios. Such a feature is known as a panorama function. The panorama function varies the aspect ratio of an exposure from a full-size to a panorama size by cropping a top and bottom of a frame. A further function permits data to be imprinted upon the film at either a full-size position or a panorama position. Such data typically consists of the date and time. It is also desirable to vary a size of the data depending upon whether a full-size mode or a panorama mode is selected. Data imprinted in the panorama mode is smaller than data imprinted in the full-size mode in order to make the presentation of the data in the panorama size frame more aesthetically appealing.

Typically LED arrays are used in conjunction with an optical element to imprint the data. If a single LED array is used in conjunction with two optical elements for imprinting data at the full-size and panorama size positions, less light reaches the film in the panorama mode than in the full-size mode because the optical element for the panorama mode is further from the LED array than is the case with the full-size mode. This is due to a reduced numerical aperture. This inequality results in unequal exposure of imprinted data between that of the full-size mode and the panorama size mode. Thus, imprinted data produced in the full-size mode appears brighter than that of the panorama size mode.

A possible design for eliminating the above imbalance in exposure is to provide two LED arrays which are each positioned from a respective optical element so as to provide equal numerical apertures. Therefore, the imprinted data would be of equal brightness in both panorama-size mode and the full-size mode pictures. Although feasible, this solution would require additional parts and assembly operations, and thus, would increase the cost of production. Therefore, a more cost effective solution is sought.

OBJECTS AND SUMMARY OF THE INVENTION

Accordingly, it is an object of the invention to provide a camera with a dual position data imprinting device which overcomes the drawbacks of the prior art.

It is a further object of the invention to provide a camera having a data imprinting device which compensates for differing numerical apertures associated with different data image positions.

It is a still further object of the invention to provide a camera with a data imprinting device capable of compensating for film speeds.

It is yet another object of the invention to provide a camera with a data imprinting system which compensates for varying numerical apertures associated with data imprinting positions by controlling amounts of light emitted from a light emitting array.

An object of the present invention is to provide a camera with a data imprinting system which adjust a current drive level of a light emitting array to compensate for differing numerical apertures of the system and film speeds.

Another object of the present invention is to provide a camera with a data imprinting system which adjust an illumination period of a light emitting array to compensate for differing numerical apertures of the system and film speeds.

Briefly stated, there is provided a camera having a data imprinting device with an optical system focussing light from an LED array on a photographic film at first and second positions corresponding to full-size and panorama-size picture formats. In a first embodiment the optical system has two lens elements, at differing distances from the LED array, each aligned to imprint data at one of the two positions. In a second embodiment the optical system has a single lens element which moves from a first lens position to a second lens position at differing distances from the LED array. Amounts of light emitted by the LED array are modulated by a control system to produce correctly exposed imprinted data at both position. The control system compensates for differing numerical apertures of associated with the first and second positions. The control system also compensates for film speed. One embodiment of the invention modulates the amount of emitted light by adjusting a current level driving the LED array. Another embodiment modulates by pulse width modulating the illumination period of the LED array.

In accordance with these and other objects of the invention, there is provided a camera, having a data imprinting system, comprising: light emitting elements, optical means for focussing light from the light emitting elements on a surface of a photosensitive film at first and second positions, means for selecting one of a first frame size and a second frame size, framing means for framing images having the first and second frame sizes responsive to the means for selecting, the first and second positions being associated with the first and second frame sizes respectively, control means for imprinting data on the photosensitive by selectively illuminating the light emitting elements, and the control means including modulating means for modulating the light emitting elements to control amounts of emitted light and thereby an exposure level of the data.

According to feature of the invention, there is further provided a current control means for varying a level of current applied to the light emitting elements to adjust the amounts of emitted light.

According to a still further feature of the invention, there is still further provided a pulse modulating means for modulating the light emitting elements to vary the amounts of emitted light.

The present invention also provides a camera, having a data imprinting system, comprising: light emitting elements, optical means for focussing light from the light emitting elements on a surface of a photosensitive film at first and second positions, means for selecting one of a first frame size and a second frame size, framing means for framing images having the first and second frame sizes responsive to the means for selecting, the first and second positions being associated with the first and second frame sizes respectively, control means for imprinting data on the photosensitive by selectively illuminating the light emitting elements, the control means including modulating means for modulating the light emitting elements to control amounts of emitted light and thereby an exposure level of the data, the means for modulating having a current control means for varying a level of current applied to the light emitting elements to adjust the amounts of emitted light, the current control means being responsive to the means for selecting dependent upon a selected frame size such that data imprinted at the first and second positions has a substantially equal exposure level, input means for inputting film speed data of the photosensitive film into the control means, and the current control means being further responsive to the film speed data such that data imprinted at the first and second positions has an exposure level corresponding to the film speed.

The present invention further provides a camera, having a data imprinting system, comprising: light emitting elements, optical means for focussing light from the light emitting elements on a surface of a photosensitive film at first and second positions, means for selecting one of a first frame size and a second frame size, framing means for framing images having the first and second frame sizes responsive to the means for selecting, the first and second positions being associated with the first and second frame sizes respectively, control means for imprinting data on the photosensitive by selectively illuminating the light emitting elements, the control means including modulating means for modulating the light emitting elements to control amounts of emitted light and thereby an exposure level of the data, the modulating means having a pulse modulating means for modulating the light emitting elements to vary the amounts of emitted light, the pulse modulating means being responsive to the means for selecting dependent upon a selected frame size such that data imprinted at the first and second positions has a substantially equal exposure level, input means for inputting film speed data of the photosensitive film into the control means, and the pulse modulating means being further responsive to the film speed data such that data imprinted at the first and second positions has an exposure level corresponding to the film speed.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2a is a rear perspective view of an embodiment of the present invention partially cut away to show internal components including a dual lens optical system.

FIG. 3a is a diagram showing a spatial relationship of the optical system in FIG. 2a.

DETAILED DESCRIPTION OF THE PREFERRED EMBODIMENT

Figure 1:
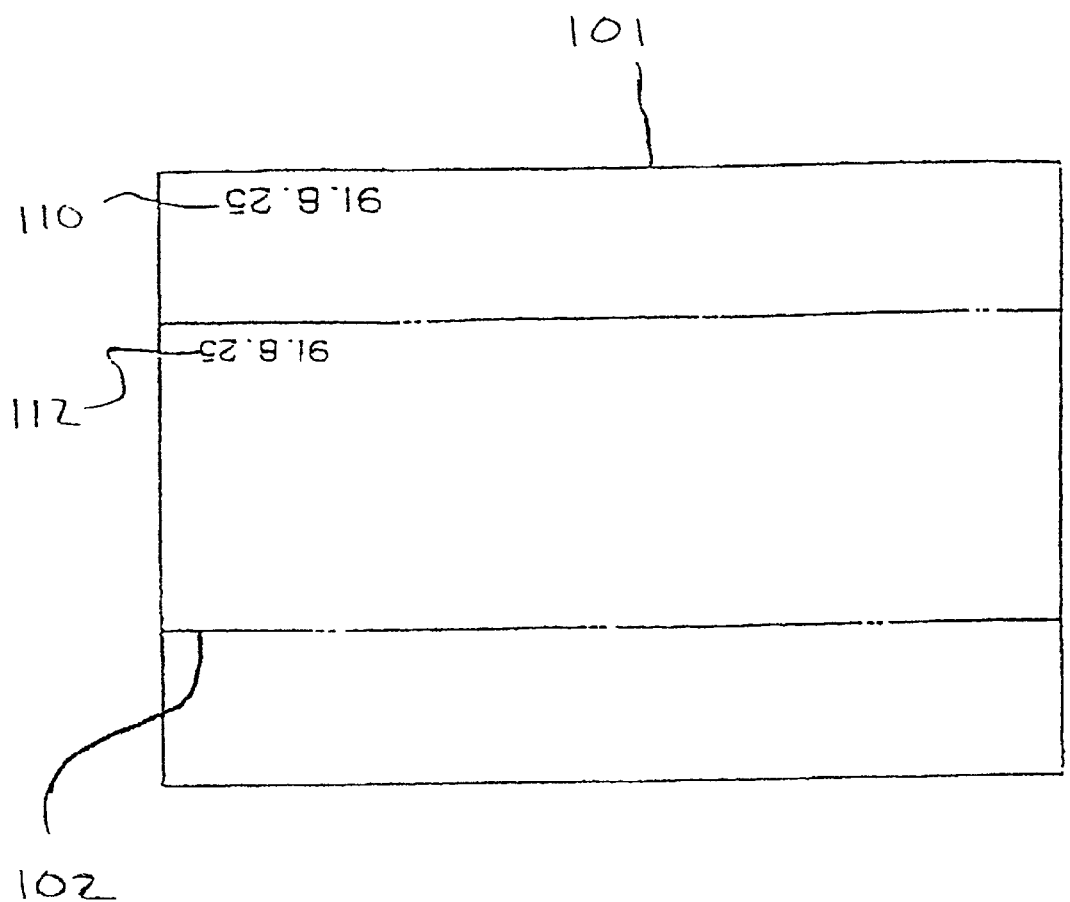
FIG. 1 is a plan view of a frame having a panorama format superimposed over a full-size format.

Referring now to FIG. 1, an exposure format of a camera of the present invention is shown wherein a panorama-size frame 102 is shown superimposed over a full-size frame 101. In practice, a user selects a full-size mode or a panorama-size mode of operation depending upon a desired aspect ratio of a picture being taken. Full-size data 110 and panorama-size data 112 are imprinted upon the respective frames in full-size and panorama-size mode positions wherein the panorama-size mode position is located beneath the full-size mode position. The full-size data 110 is larger than the panorama-size data 112 for aesthetic purposes. In FIG. 1 the data consists of a date, however, it is clear that other data such as, for example, a time of day, may be imprinted in combination with or instead of, or together with, the date.

Figure 2A:
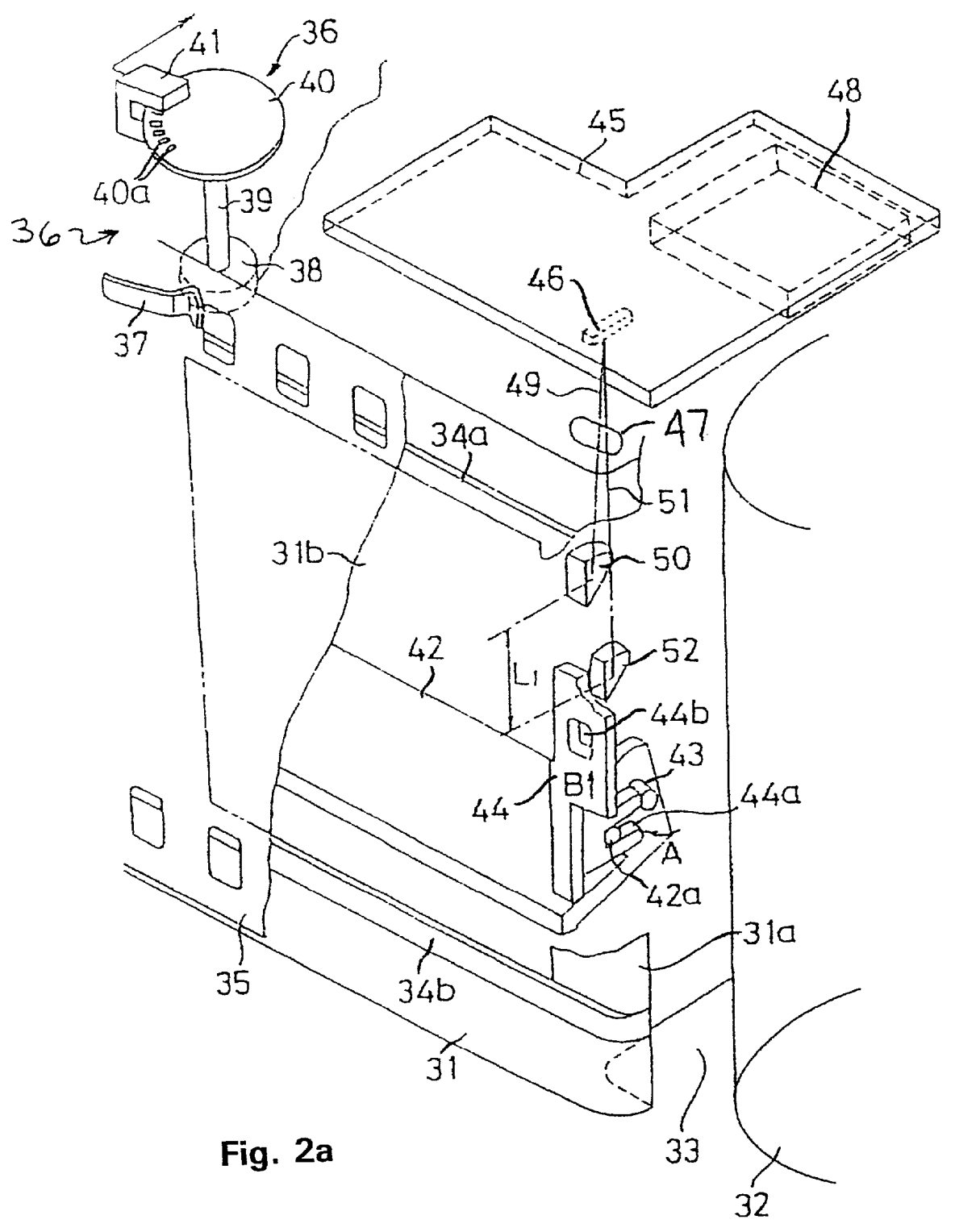

Referring to FIG. 2a, there is shown an embodiment of the present invention having first and second optical elements, 50, 52. A camera body 31 has an aperture 31b through which an image is focused upon a film 35 drawn over the aperture 31b by a take-up spool 32. The film 35 rides upon rails 34a, 34b, over which it is drawn into a spool chamber 33. An LED assembly board 45 and a film advance detector 36 are incorporated into an upper portion of the camera body 31.

The LED assembly board 45 has an LED array 46 which is driven by a driver circuit 48. The LED array 46 emits light rays 49, 51 which are imaged on the film 35.

The film advance detector is a rotary encoder including a spring 37 which presses the film 35 against a roller 38. As the film advances, the roller 38 rotates a slotted disc 40 via a shaft 39. The slotted disc 40 has slot apertures 40a which pass between the arms of an optointerruptor 41. Optointerruptor 41 contains a light source (not shown) in one of its arms, and an optical detector (not shown) in the other of its arms. As slots of the slotted disc 40 pass between the light source and the optical detector, the optical detector produces a feed pulse signal (FPS) which is applied to a CPU (not shown) to indicate an increment of advance of the film 35.

The camera body 31 has an aperture 47 through which the light rays 49, 51, pass. The light rays 49, 51, are incident upon respective ones of the first and second optical elements 50, 52, which are separated by a distance $L_1$ corresponding to a separation between the full-size mode position and the panorama mode position. The first optical element 50 focuses the light ray 49 upon the film 35 at the full-size mode position 110 (shown in FIG. 1) and the second optical element 52 focuses the light ray 51 upon the film 35 at the panorama mode position 112 (shown in FIG. 1). A lower masking member 42 is rotatably supported upon a pin 43 which engages an opening (not shown) in a separating wall 31a shown partially cut-away. A data shutter 44 is slidably fixed in the separating wall 31a. The data shutter 44 includes a slot 44a engaging a boss 42a on the lower masking member 44.

The lower masking member 42 pivots between a lower position as shown in the full-size mode and an upper position (not shown) in the panorama size mode. In its respective positions, the data shutter 44 blocks the passage of imprinting data through the unselected one of the first and second optical elements, so that the unblocked imprinting data is suitably positioned on the film 35, and unwanted data is isolated from film 35. In the upper position, the lower masking member 42 masks a lower portion of the film 58 and raises the data shutter 44 in an upward direction B such that an aperture 44b, in the data shutter 44, is aligned with the second optical element 52 thereby permitting the light ray 51 to be focused upon the film 35. Alternatively, the data shutter 44 occludes an emergent ray from the second optical element 52, while permitting the passage of light ray 49, when the lower masking shutter 42 is in the lower position as shown.

Figure 2B:
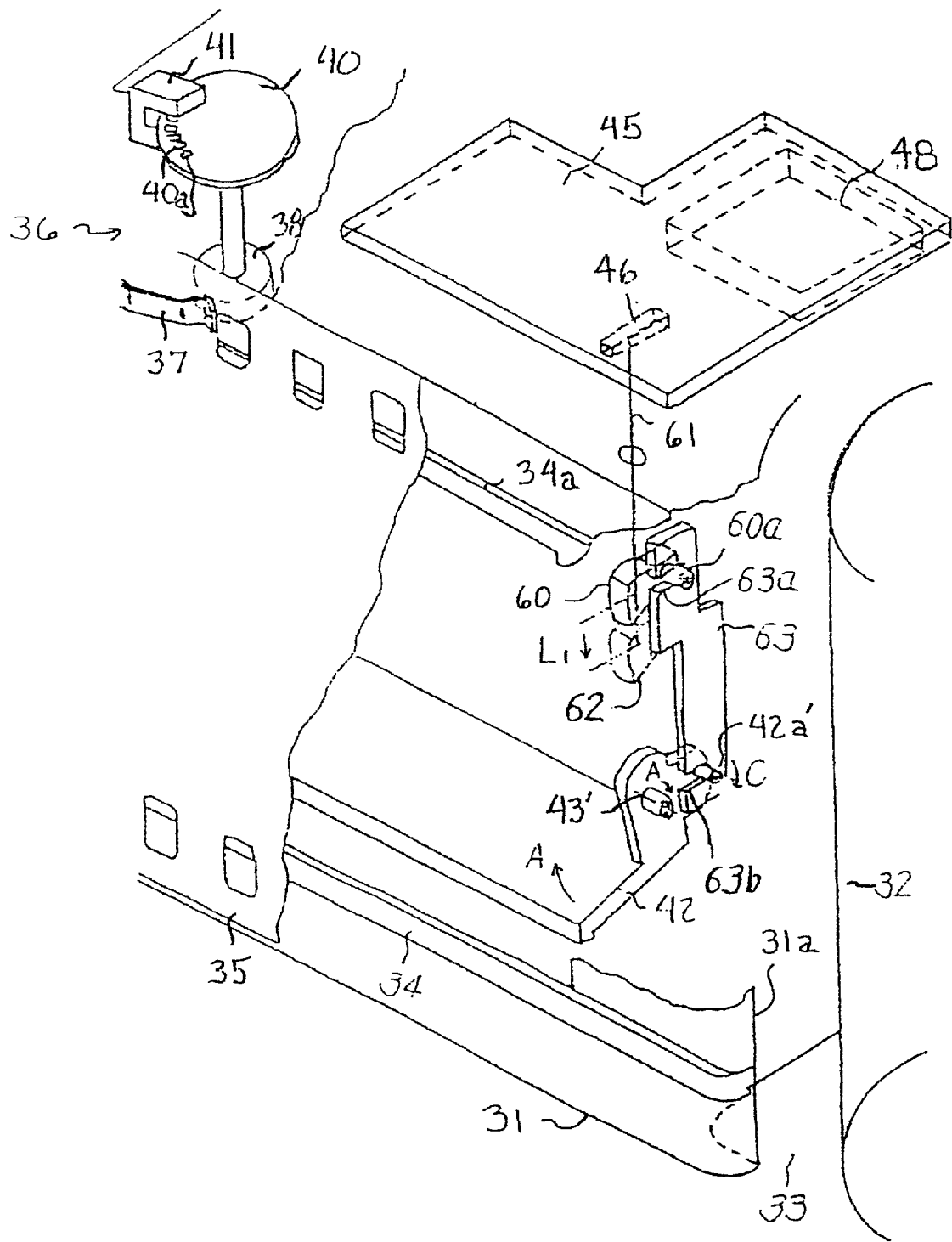
FIG. 2b is a rear perspective view of another embodiment of the present invention partially cut away to show internal components including a single lens optical system.

Referring to FIG. 2b, a second embodiment of the present invention is shown which is similar to the above embodiment except as discussed below. A single optical element 60 is used for data imprinting in both the full-size and panorama modes of operation. The single optical element 60 is slidably fixed in the separating wall 31. A pin 60a affixed to single optical element 69 engages a first slot 63a in a coupling member 63. The coupling member 63 has a second slot 63b engaging a pin 42a' of a lower masking member 42'. The lower masking member 42' is rotatably mounted by a pivot pin 43' engaging a hole (not shown) in the separating 31a (shown cut-away). The lower masking member 42' is shown in a full-size mode position wherein it is lowered to enable full-size exposure. The coupling member 63 is in a raised position (as shown) supporting the single optical element in a full-size mode position so that the LED array 46 is focused upon the film 35 at the full-size mode position shown in FIG. 1.

To enter the panorama mode, the lower masking member 42' is rotated in a direction of arrow A to arrive at a panorama-mode position such that a lower portion of the film 35 is masked from exposure. The pin 42a' rotates in the direction of arrow C thereby lowering the single optical element 60 a distance $L_1$ to a panorama-mode position shown by dashed lens outline 62 such that it images the LED array 46 upon the film 35 at the panorama-mode position indicated in FIG. 1.

Figure 3A:
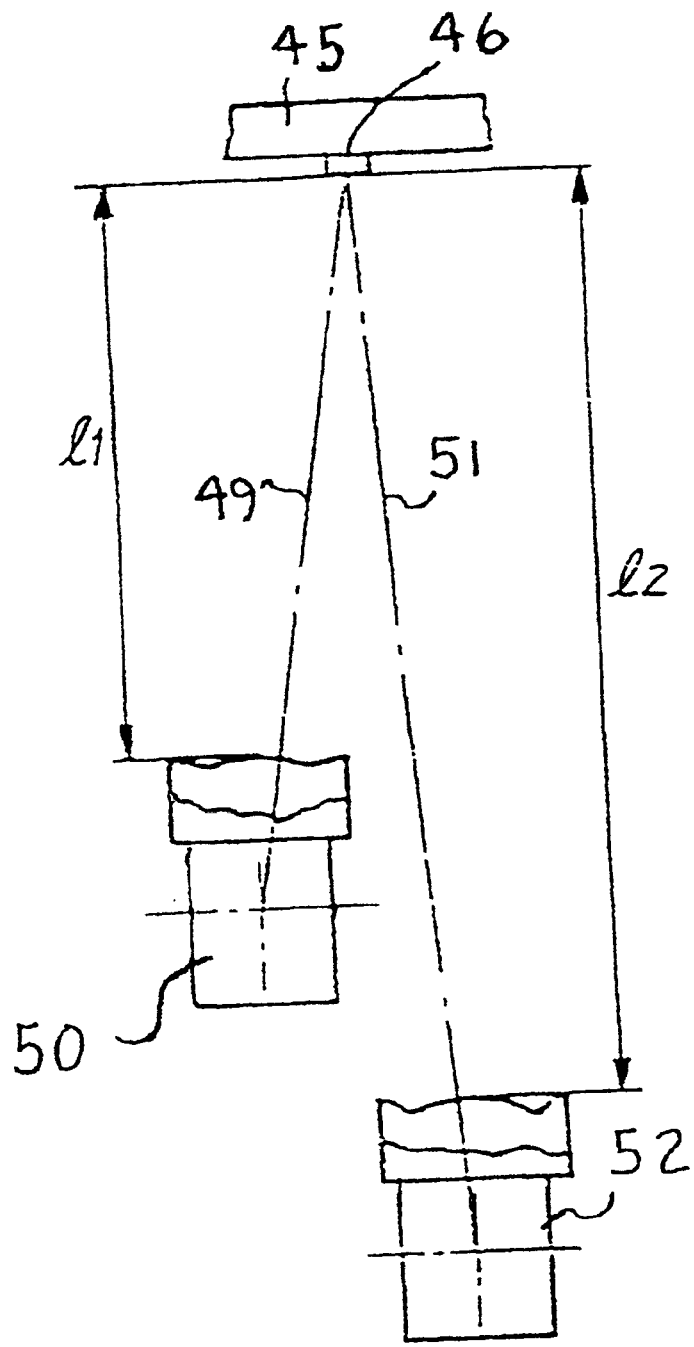
Figure 3B:
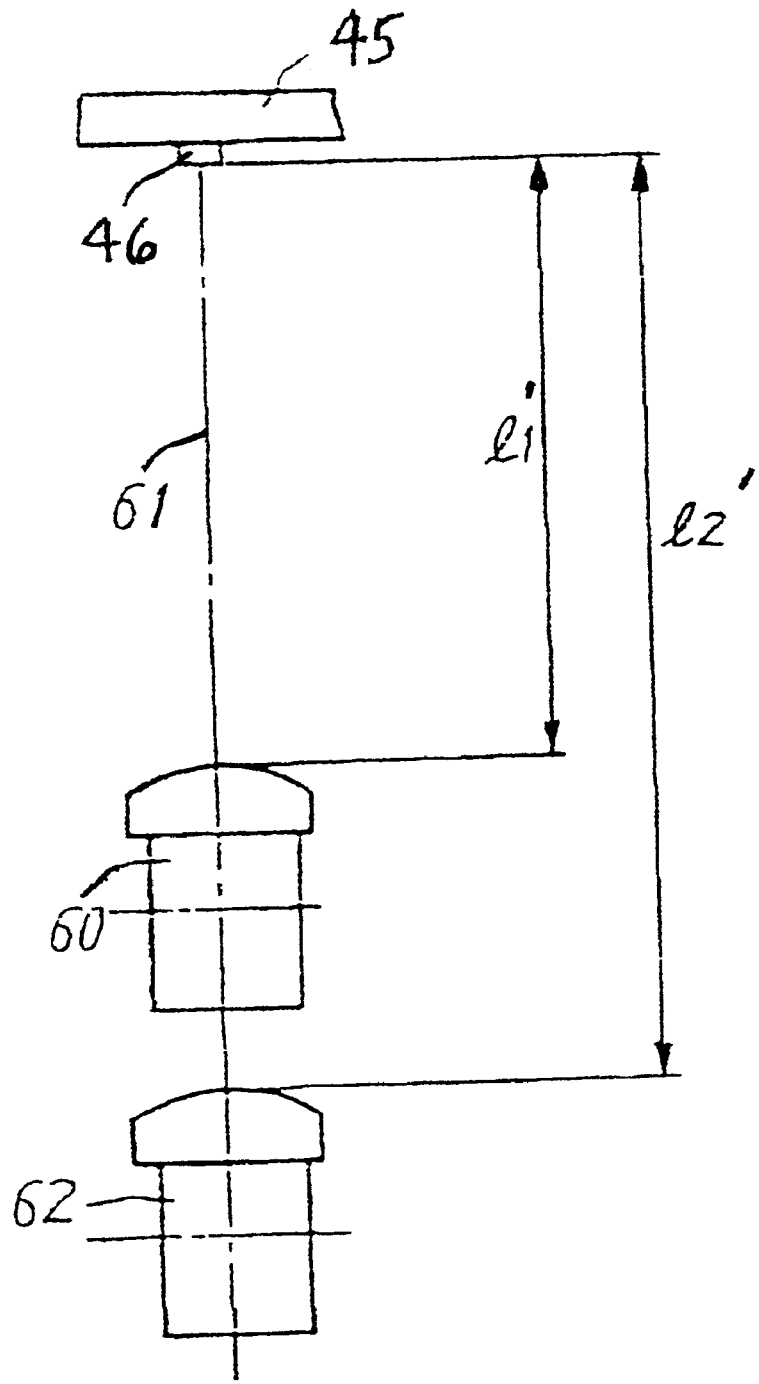
FIG. 3b is a diagram showing a spatial relationship of the optical system in FIG. 2b.

Referring to FIG. 3a, a rear view shows a spatial relationship of the first and second optical elements, 50, 52, to the LED array 46, corresponding to the arrangement of the first embodiment in FIG. 2a. The first optical element 50 is positioned a distance $l_1$ below the LED array 46 while the second optical element 52 is below the first optical element 50 and a distance $l_2$ beneath the LED array 46. The first and second elements, 50, 52, are offset from one another such that their respective light paths, 49 and 51 are not obstructed. The first and second optical elements 50, 52, have equal or substantially equal diameters which results in the second optical element 52 having a smaller numerical aperture than the first optical element since the LED array 46 is a greater distance from it. Therefore, with equal source brightness, an image produced by the second optical element 50 is dimmer than an image produced by the first optical element 52 when LED array 46 is the source being imaged. Thus, the imprinted data at the panorama mode position 112 is underexposed in comparison to the imprinted data at the full-size mode position 110. The spatial relationship of the single optical element of the second embodiment is shown in FIG. 3b, wherein a similar problem exists. The distance $l_2'$ between the panorama position 62 and the LED is greater than the distance $l_1'$ between the single optical element 62, in the full-size mode position. The LED array 46, thus, results in a lower numerical aperture and under-exposure of imprinted data at the panorama mode position. Alternatively, the imprinted data at the full-size position may be overexposed.

It would be possible to produce uniform exposure of the imprinted data by a design having two LED arrays positioned equidistant from respective ones of the first and second optical elements, 50 and 52, in the first embodiment. Similarly, a design of the second embodiment could incorporate an LED array which is movably supported so that it may travel in conjunction with the single optical element 60 and remain a constant distance from it. Each design would produce uniform exposure, however, the added parts and mechanical complexity of the above designs would add to the cost of production.

Figure 4:
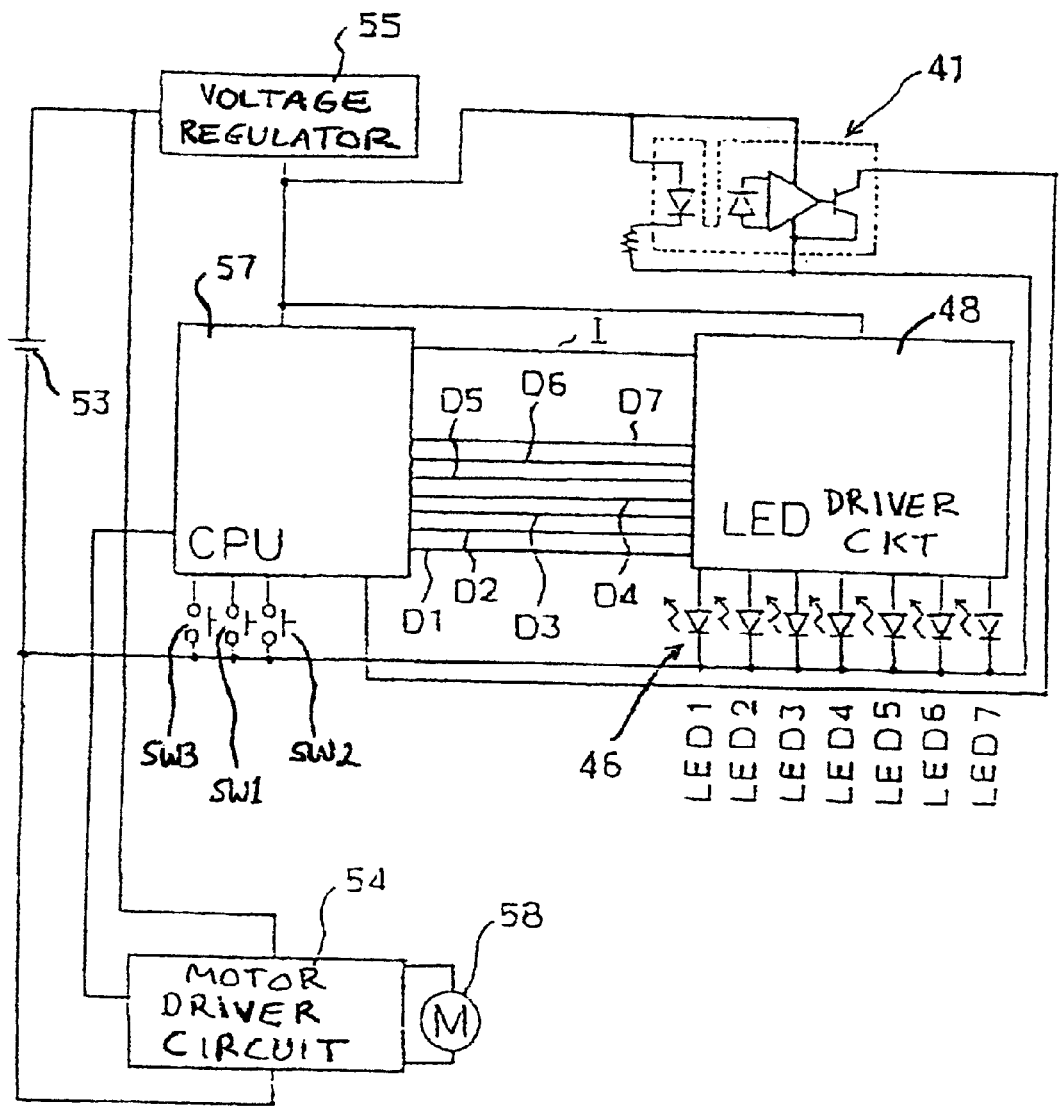
FIG. 4 is a simplified electrical block diagram of a control system according to an embodiment of the invention.

Referring to FIG. 4, a circuit schematic of an embodiment of the present invention shows the CPU 57 interfacing with the LED driver circuit 48 via data lines D1–D7, each controlling a respective one of LED1 through LED7 which comprise the LED array 46. A voltage regulator supplies power from a battery 53 to the CPU 57, the optointerrupter 41 and the LED driver circuit 48. A motor driver circuit 54 is controlled by the CPU 57 to drive a motor 58. The motor 58 is coupled to the take up spool 32 (shown in FIGS. 2a and 2b) for advancing the film 35. The CPU 57 receives the FPS from the optointerrupter 41 which signals an advancement of the film and provides feedback for controlling the motor 58.

The CPU 57 is connected to a half-travel switch SW1 and a full-travel switch SW2. The half-travel switch SW1 is closed when a shutter release button is depressed to a mid-range position. The full-travel switch is closed when the shutter release button is fully depressed. The CPU 57 is also connected to a mode switch SW3 which is closed when the operating mode is set to the panorama mode position. The status of the half-travel, full-travel, and mode switches, SW1, SW2, and SW3, determines the operational status of the CPU 57 according to a program stored therein as discussed below.

In order to effect equal exposure of data imprinted in both the panorama and full-size modes, the amount of light emitted by the LED's LED1–LED7 is varied by the CPU 57 by one of two methods of the present invention. In a first method the CPU controls the amount of current used to drive the LED's LED1–LED7 by setting control line I to one of two states corresponding to full-size or panorama modes of operation. In the panorama mode of operation a high level current drives the LED's LED1–LED7 at a level of approximately 20 mA. As is well known, the brightness of an LED varies in accordance with the current passing through it. Thus, an LED driven at 20 mA exhibits a greater source brightness than one driven at 10 mA.

In the full-size mode, pulses of a low level current of approximately 17 mA are applied to the LED's LED1–LED7 to light individual ones of the LED's LED1–LED7 selectively at the desired current level as the film is advanced to imprint a required data pattern upon the film. In the present embodiment, each data character is formed by a 5×7 dot matrix. Thus, a particular LED may be illuminated up to 5 times during an advance of the film corresponding to the width of one character. It is realized that the above current levels may be varied dependent upon an efficiency of the LED's LED1–LED7. Furthermore, the current levels may be varied to compensate for a speed of the film in the camera where an input means is provided for entering the film speed to the CPU memory. In a still further embodiment, the control line may carry an analog signal capable of continuously varying the current level so that a variety of levels may be set. Alternatively, several data bit lines can be used in order to digitally set numerous current levels. Such variations are considered to be within the scope and spirit of the present invention.

A second method of controlling the amount of light emitted includes modulating the period of illumination of the individual LED's LED1–LED7. The illumination period in the panorama mode is longer than the illumination period in the full-size mode. As a result, more light is emitted in the panorama mode than in the full-size mode. The illumination period thereby extends the exposure time for the imprinted data and compensates for the smaller numerical aperture of the panorama mode imprinting arrangement. The CPU 57 controls the illumination period directly via logic levels on the data lines D1–D7, thereby eliminating the need for the current control line I used in the first method described above. The illumination period is also selected according to a speed of the film to produce correctly exposed characters. One embodiment of the present invention uses illumination periods presented in Table 1 below.

The LED's LED1–LED7 are presented as an example of a preferred means of illumination and not as a limitation. Alternative embodiments of the present invention can utilize light sources other than LED's. Other light sources include back-lit LCD arrays or electroluminescent arrays. For instance, a back-lit LCD array functions as the equivalent of a plurality of light sources and selective gating of the back-light by LCD elements is considered to be the equivalent of illuminating individual ones of the LED's LED1–LED7.

TABLE 1

| FILM SPEED (ISO) | ≦100 | 200 | 400 | ≧800 |
|---|---|---|---|---|
| FULL-SIZE MODE ILLUMINATION PERIOD (μs) | 120 | 80 | 40 | 20 |
| PANORAMA MODE ILLUMINATION PERIOD (μs) | 160 | 120 | 80 | 40 |

A still further embodiment of the present invention may utilize both of the above methods of controlling emitted light. In such an arrangement, the current may be varied to compensate for either the full-size or the panorama mode being selected and the illumination period may be varied to compensate for film speed. Alternatively, the first and second methods may compensate for film speed and a selected picture mode respectively. Finally, while the embodiments presented have two modes of operation, it is realized that the present invention extends to embodiments having multiple modes of operation wherein multiple exposure levels are required to compensate for differing numerical apertures and/or film speeds.

Figure 5:
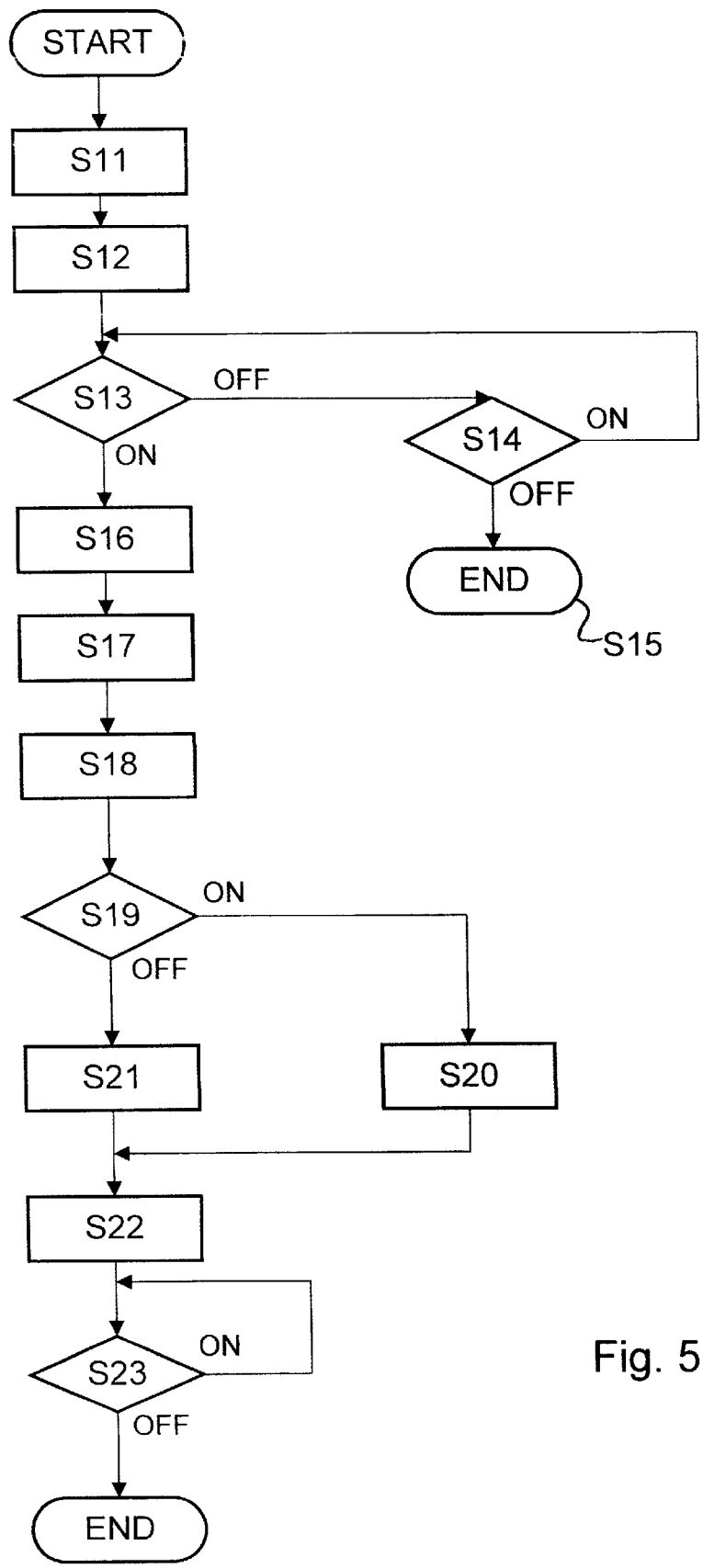
FIG. 5 is an operating program flow chart of a program used in the present invention.

Referring to FIG. 5, a high level flow chart of an operating program of a camera of the present invention is shown. The program is stored in a ROM memory within the CPU and includes subroutines and utilizes circuits which are not described in detailed because they are either outside of the scope of the present invention or readily implemented by those skilled in the art having viewed this disclosure. The method of operation of the camera starts with the CPU 57 initiating a light measurement subroutine S11 in response to the half-travel switch SW1 being closed indicating that the release button has been depressed at least halfway. A light measurement circuit senses a level of light arriving from an object to be photographed and a shutter speed is calculated and stored for later use in a shutter release subroutine S17. Operation then proceeds to a distance measuring subroutine S12 wherein an electronic distance detecting circuit senses a distance to an object, usually by sonar means. The distance measured is than stored in memory and is later used to set a power focus device in an auto-focus subroutine S16.

After both the light level and the object distance is determined the CPU 57 determines whether the full-travel switch SW2 is ON (closed) or OFF (open) at step S13. If the full-travel switch SW2 is closed the program determines that the shutter release button has been fully depressed in order to take a picture. The program then proceeds to execute the auto-focus subroutine S16, the shutter release subroutine S17, and a lens return subroutine S18 wherein the lens is returned to a standby position. Alternatively, if the full-travel switch JW2 is OFF, the program proceeds to determine the state of the half-travel switch SW1. If the half-travel switch SW1 is off, indicating that the release button is not depressed, the program ends and awaits a future closure of the half-travel switch SW1 to re-initiate operation from the starting point. However, if the half-travel switch is ON, the program returns to test the full-travel switch SW2 status at step 13. Therefore, if the release button is pressed half-way, the program continually monitors the full-travel switch SW2 without redetermining the light level or the object distance.

Following the completion of an exposure, the CPU 57 proceeds to step S19 at which point a state of the mode switch SW3 is read. In the present embodiment, if the mode switch is closed a panorama subroutine at step S20 stores data for the execution of panorama mode imprinting. Alternatively, if the mode switch is open a full-size subroutine at step S21 stores data for the execution of full-size mode data imprinting. If the first method of illumination control is used, the panorama subroutine sets the control line I to a high current level state and the full-size subroutine sets the control line I to a low current level state. If the second method of illumination control is used, the panorama subroutine stores a long illumination period value and the full-size subroutine stores a short illumination period value for use during data imprinting. Depending upon an embodiment of the invention, these illumination periods are either a single value for each mode or are selected from a look-up table in memory to further compensate for film speed as discussed above with reference to table 1. Once data corresponding to the mode of operation has been set, a film advance subroutine is executed at step S22 wherein data is imprinted upon the film. The film advance subroutine returns control to step S23 where the half-travel switch SW1 is repeatedly read until it is determined that it is off, indicating that the shutter release button is no longer depressed, at which point the program ends.

Figure 6:
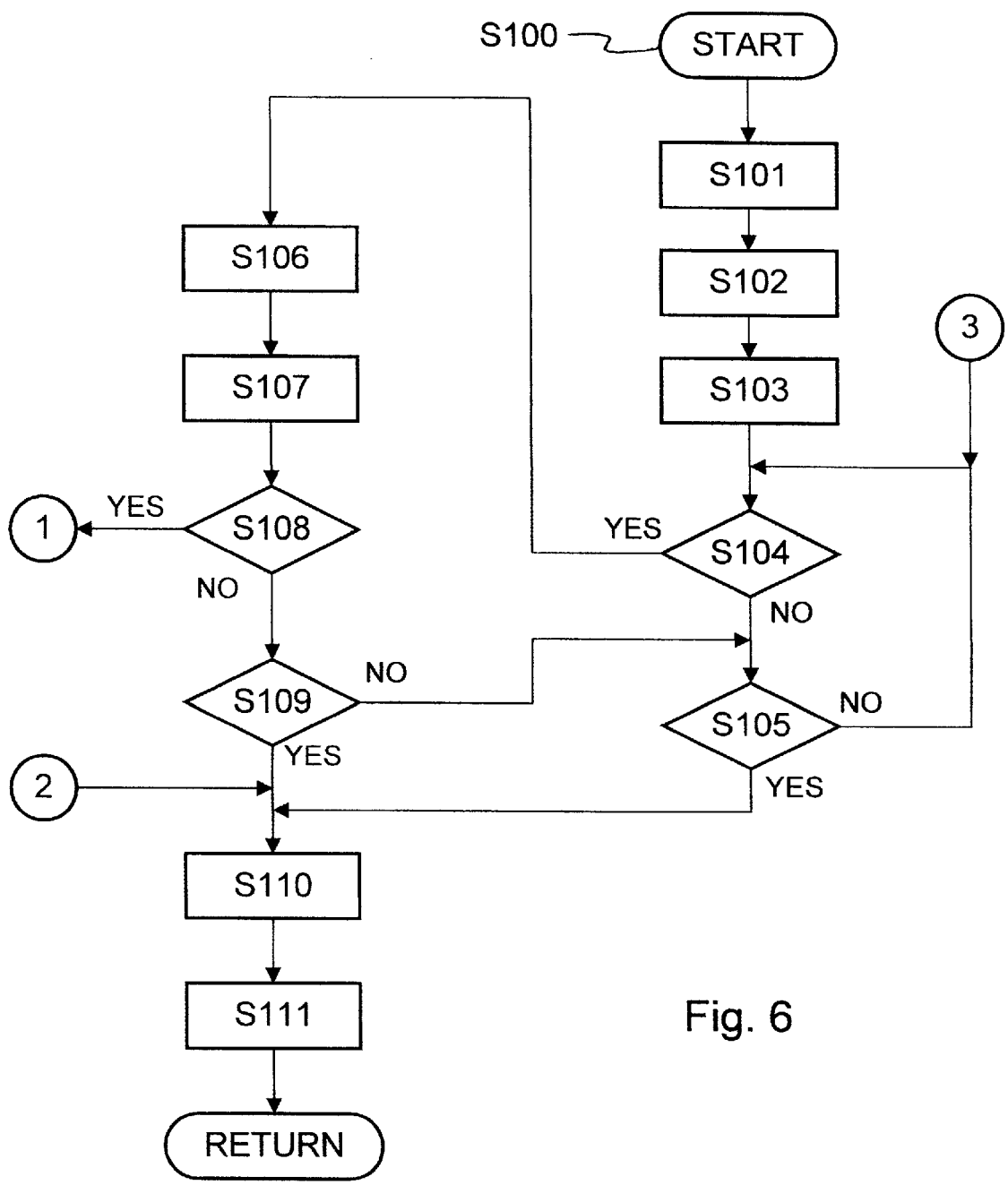
FIG. 6 is a flow chart of a film advance subroutine called from the operating program flow chart of FIG. 5.

Referring to FIG. 6, a flow chart of the film advance subroutine 23 is shown. The subroutine begins execution at film advance start step S100 when the film advance subroutine 23 is advanced to in FIG. 5. An end-of-film detection timer is initialized at step S101 by setting it to 0 and a level of the FPS is stored. While the film advance subroutine is being executed the CPU 57 functions as a timer for detecting a length of time since the last pulse from the FPS was detected. An FPS counter is then set to 0 in step S102. The FPS counter is incremented when the CPU 57 detects a change in level of the FPS received from the optointerrupter 41 (shown in FIG. 4). The change in level indicates that the film has advanced enough to rotate a leading or trailing edge of a slot 40a past the optointerrupter 41.

The motor 58 is then activated at step 103 to advance the film after which the level of the FPS signal and the end-of-film detection timer are monitored in a first loop consisting of steps S104 and S105, respectively. If it is found that the FPS level has not changed since it was last checked and that a predetermined time-out period has expired during which a level change should have been detected if the film was advancing, the program concludes that an end of the film has been reached. If the time-out period expires, the motor 58 is braked for 100 ms at step S110 before it is turned off in step S111. Alternatively, if a change in the FPS level is detected at step S104, the subroutine enters a second loop consisting of steps S106, S107, S108, S109, S105, and S104 until either the FPS counter reaches 200 or 360, or the film runs out. In the second loop, at step S106, the end-of-film detection timer is re-initialize since a change in FPS level was detected at step S104. Next, the FPS counter is incremented at step S107.

The second loop is executed 200 times until the FPS counter reaches 200 which corresponds to a position on the film frame where imprinting is to begin. The FPS counter is read at step S108 and, if it equals 200, an imprinting routine (shown in FIG. 7) is executed. The imprinting routine prints data at selected positions corresponding to FPS counter values 200 through 279 and is discussed below. When the FPS counter reaches a value of 280 the imprinting routine control is transferred back to the film advance subroutine S22 at step S104. The loop comprising steps S104, S106, S108, and S109, is executed until the FPS counter reaches a count of 360 which indicates that an end of the frame has been reached. At this point the motor 58 is braked for a period of 100 ms at step S110 and then stopped at step S111. Step S112 returns control to the operating program, flow charted in FIG. 5, at step S23 where the half-travel switch SW1 is read until the half-travel switch SW1 is released and the program ends.

Figure 7:
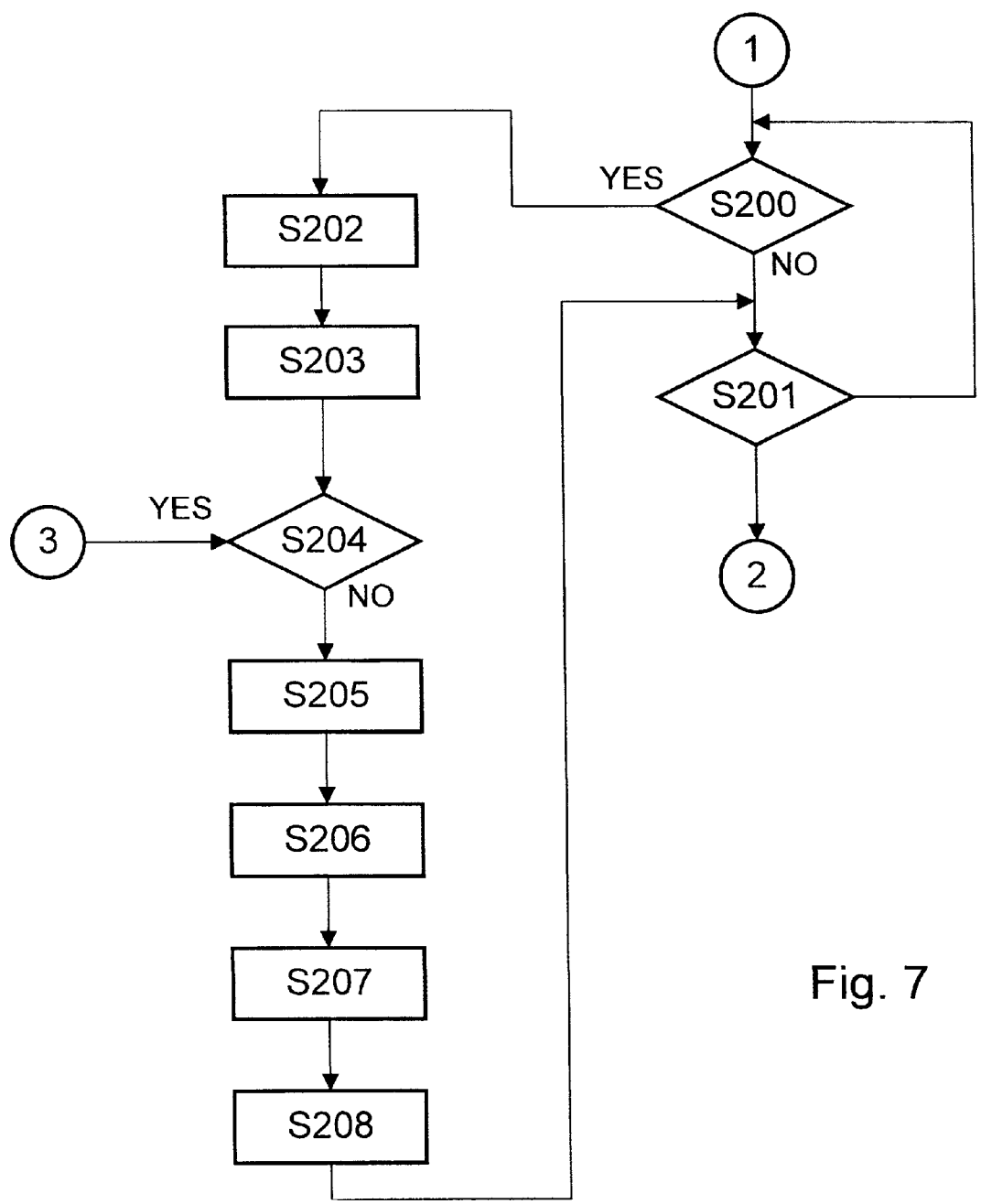
FIG. 7 is a flow chart of an imprinting routine associated with the film advance subroutine of FIG. 6.

Referring to FIG. 7, a flow chart is shown of the imprinting routine wherein data is selectively imprinted upon the film as it advances through positions corresponding to FPS counter values of 200 through 279. Each count corresponds to a column of dots to be imprinted. The columns combine to produce 5×7 dot matrix characters. Therefore, as each column is imprinted, the LED's LED1–LED7 are independently illuminated to create desired characters. The imprinting routine begins at step S200 where the FPS signal is monitored for a change in level indicating that the film is advancing. Once a change in level is detected, the end-of-film detect timer is initialized to 0 at step S202 and the FPS counter is incremented by 1 at step S203. If no change in FPS level is detected at step S200 and the time-out period is found to have not expired at step S201 then the FPS level is again tested at step S200. The loop S200–S201 is executed until the FPS level changes or the time-out period expires. If expiration of the time-out period is detected at step S201, control is returned to the film advance subroutine S22 where the motor 58 is braked and stopped.

After the FPS counter is incremented at step S203, the counter value is tested at step S204. If the counter value equals 280 the imprinting routine surrenders control to the film advance subroutine of FIG. 6 and imprinting ceases. Otherwise, while the FPS counter does not equal 280, steps S205 through S208 handle imprinting data on the film. Thus, data is imprinted at positions corresponding to FPS counter values ranging from 200 to 278. Although not illustrated, other embodiments of the present invention can vary the FPS counter values for beginning and ending imprinting according to a framing mode selected, thereby adjusting a horizontal position of data imprinted in a frame. Such embodiments are not detailed further as they may be effectively realized by those skilled in the art having viewed this disclosure.

At step S205, imprinting data bits corresponding to the LED's LED1–LED7 are read from a memory area in the CPU. The memory area in the present example is updated with data required to print a date. This data is determined by an internal calendar function and an internal clock in the CPU 57. Such calendar functions are known to those skilled in the art and are therefore omitted from this description. It is further realized that means may be provided to enter other types of data into the memory area and such an embodiment is considered to be within the scope and spirit of the present invention.

Once the imprinting data bits are read at step S205 they are then output to the LED driver circuit 48 at step S206. The LED's LED1–LED7 are either illuminated or not illuminated based upon a logic level of respective ones of the data lines D1–D7. The imprinting process proceeds to step S207 wherein a wait period, corresponding to a predetermined illumination period, is executed. If the first method of illumination control is employed, wherein the current level is set by one of the panorama subroutine or the full-size subroutine of steps S20 and S21 according to the mode selected, the predetermined period will be fixed regardless of the mode selected and read from a particular memory location. Alternatively, if the second method of illumination control is used, the predetermined period will have been selected by the appropriate one of the panorama subroutine or the full-size subroutine so as to compensate for the mode selected, or the mode selected and the film speed, dependent upon the particular embodiment of the invention. In such embodiments the LED's are viewed as being pulse-width modulated. It is also realized that the predetermined illumination period can be selected to compensate for film speed alone while the current level is set to compensate for the mode of operation. After the wait period has passed, the imprinting data bits are turned off at step S208 and the imprinting routine returns to the loop S200–S201 for the detection of a subsequent FPS level change at step S200 initiating the printing of another column.

It is further realized that other embodiments of the present invention can modulate a duty cycle of the illumination wherein several pulses of light are emitted for a given column. That is, each dot may be exposed using, for example, 10 pulses for full-size mode, and 20 pulses for panorama mode. Electrical illuminating hardware means can be set to a desired duty cycle by an operating program which in turn actuates the electrical illuminating hardware for fixed periods of time regardless of a selected mode. The sum of the pulse periods emitted is then the equivalent of the predetermined illumination period. For the purposes of this disclosure, pulse modulation is viewed as including either pulse-width modulation or pulse frequency modulation wherein a sum of pulse on-time over a given period is varied. Such a method is considered to fall within the spirit and scope of the present invention.

The imprinting routine of FIG. 7 proceeds to print columns until the FPS counter reaches 280 at which point control is surrendered to the film advance subroutine S22 detailed in FIG. 6. The first and second loops of the film advance subroutine S22, which include steps S104–S105 and steps S106, S107, S108, S109, S105, and S104 respectively, are then executed until the FPS counter reaches 360 indicating that the end of the frame has been reached. The motor 58 is then braked for a period of 100 ms at step S110 and stopped at step S111.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A camera, having a data imprinting system, comprising:
   light emitting elements;
   first and second optical elements;
   said first and second optical elements effective for focussing light from said light emitting elements on a surface of a photosensitive film at first and second positions;

a selector;

said selector effective for selecting one of a first frame size and a second frame size;

a masking member;

said masking member effective for framing images having said first and second frame sizes and responding to said selector;

said first and second positions being associated with said first and second frame sizes respectively;

a controller;

said controller effective for imprinting data on said photosensitive film by selectively illuminating said light emitting elements;

a modulator in said controller;

said modulator effective for modulating said light emitting elements to control amounts of emitted light and thereby an exposure level of said data;

said controller further effective for varying a level of current applied to said light emitting elements to adjust said amounts of emitted light; and said controller being responsive to a selected frame size such that data imprinted at said first and second positions has a substantially equal exposure level.

2. A camera according to claim 1 wherein said controller is further responsive to a film speed of said photosensitive film such that data imprinted at said first and second positions has an exposure level related to said film speed.

3. A camera, having a data imprinting system, comprising:

light emitting elements;

first and second optical elements;

said first and second optical elements effective for focussing light from said light emitting elements on a surface of a photosensitive film at first and second positions;

a selector;

said selector effective for selecting one of a first frame size and a second frame size;

a masking member;

said masking member effective for framing images having said first and second frame sizes and being responsive to said selector;

said first and second positions being associated with said first and second frame sizes respectively;

a controller;

said controller effective for imprinting data on said photosensitive film by selectively illuminating said light emitting elements;

a modulator in said controller;

said modulator effective for modulating said light emitting elements to control amounts of emitted light and thereby an exposure level of said data;

said modulator including a pulse modulator effective for pulse modulating said light emitting elements to vary said amounts of emitted light; and said pulse modulator being responsive to a selected frame size such that data imprinted at said first and second positions has a substantially equal exposure level.

4. A camera according to claim 3 wherein said pulse modulator is further responsive to a film speed such that data imprinted at said first and second positions has an exposure level corresponding to said film speed.

5. A camera, having a data imprinting system, comprising:

light emitting elements;

an optical element which is movable between first and second lens positions;

said optical element effective for focussing light from said light emitting elements on a surface of a photosensitive film at respective first and second positions;

said second lens position being further from said light emitting elements than said first lens position thereby resulting in a smaller numerical aperture with said optical element in said second lens position than with said optical element in said first lens position;

a selector;

said selector effective for selecting one of a first frame size and a second frame size;

movement of said optical element being responsive to said selector;

a masking member;

said masking member effective for framing images having said first and second frame sizes and being responsive to said selector;

said first and second positions being associated with said first and second frame sizes respectively;

a controller;

said controller effective for imprinting data on said photosensitive film by selectively illuminating said light emitting elements;

a modulator in said controller;

said modulator effective for modulating said light emitting elements to control amounts of emitted light and thereby an exposure level of said data; and said controller being responsive to a selected frame size such that data imprinted at said first and second positions has a substantially equal exposure level.

6. A camera according to claim 5 wherein said controller is further responsive to a film speed such that data imprinted at said first and second positions has an exposure level corresponding to said film speed.

7. A camera according to claim 5 wherein said modulator includes a pulse modulator; said pulse modulator being effective for pulse modulating said light emitting elements to vary said amounts of emitted light.

8. A camera according to claim 7 wherein said pulse modulator is responsive to a selected frame size such that data imprinted at said first and second positions has a substantially equal exposure level.

9. A camera according to claim 8 wherein said pulse modulator is further responsive to said film speed data such that data imprinted at said first and second positions has an exposure level corresponding to said film speed.

10. A camera according to claim 7 wherein said pulse modulator is responsive to a film speed such that data imprinted at said first and second positions has an exposure level corresponding to said film speed.

11. A camera, having a data imprinting system, comprising light emitting elements;

first and second optical elements;

said first and second optical elements effective for focussing light from said light emitting elements on a surface of a photosensitive film at first and second positions;

a selector;

said selector effective for selecting one of a first frame size and a second frame size;

a masking member;

said masking member effective for framing images having said first and second frame sizes and responding to said selector;

said first and second positions being associated with said first and second frame sizes respectively;

a controller;

said controller effective for imprinting data on said photosensitive film by selectively illuminating said light emitting elements;

a modulator in said controller;

said modulator effective for modulating said light emitting elements to control amounts of emitted light and thereby an exposure level of said data;

said first and second optical elements being at first and second lens positions effective for focusing light at respective ones of said first and second positions on said photosensitive film;

said second lens position being further from said light emitting elements than said first lens position thereby resulting in a smaller numerical aperture with said second optical element in said second lens position than with said first optical element in said first lens position;

a data shutter;

said data shutter effective for occluding imaging by one of said first and second optical elements, said data shutter being responsive to said selector; and said modulator including a device;

said device being effective for varying a level of current applied to said light emitting elements to adjust said amounts of emitted light.

12. A camera according to claim 11 wherein said device is responsive to said selector dependent upon a selected frame size such that data imprinted at said first and second positions has a substantially equal exposure level.

13. A camera according to claim 12 wherein said device is further responsive to a film speed such that data imprinted at said first and second positions has an exposure level corresponding to said film speed.

14. A camera, having a data imprinting system, comprising:

light emitting elements;

first and second optical elements;

said first and second optical elements effective for focussing light from said light emitting elements on a surface of a photosensitive film at first and second positions;

a selector;

said selector effective for selecting one of a first frame size and a second frame size;

a masking member;

said masking member effective for framing images having said first and second frame sizes and responding to said selector;

said first and second positions being associated with said first and second frame sizes respectively;

a controller;

said controller effective for imprinting data on said photosensitive film by selectively illuminating said light emitting elements;

a modulator in said controller;

said modulator effective for modulating said light emitting elements to control amounts of emitted light and thereby an exposure level of said data;

said first and second optical elements being at first and second lens positions effective for focusing light at respective ones of said first and second positions on said photosensitive film;

said second lens position being further from said light emitting elements than said first lens position thereby resulting in a smaller numerical aperture with said second optical element in said second lens position than with said first optical element in said first lens position;

a data shutter;

said data shutter effective for occluding imaging by one of said first and second optical elements, said data shutter being responsive to said selector;

said modulator including a pulse modulator effective for modulating said light emitting elements to vary said amounts of emitted light; and said pulse modulator is responsive to a selected frame size such that data imprinted at said first and second positions has a substantially equal exposure level.

15. A camera according to claim 14 wherein said pulse modulator is further responsive to a film speed such that data imprinted at said first and second positions has an exposure level corresponding to said film speed.

16. A camera, having a data imprinting system, comprising:

light emitting elements;

at least one optical element effective for focussing light from said light emitting elements on a surface of a photosensitive film at first and second positions;

a selector effective for selecting one of a first frame size and a second frame size;

a masking member effective for framing images having said first and second frame sizes and responding to said selector;

said first and second positions being associated with said first and second frame sizes respectively;

a controller effective for imprinting data on said photosensitive film by selectively illuminating said light emitting elements;

said controller including a modulator;

said modulator effective for modulating said light emitting elements controlling amounts of emitted light and thereby an exposure level of said data;

said modulator having a device effective for varying a level of current applied to said light emitting elements to adjust said amounts of emitted light;

said device being responsive to a selected frame size such that data imprinted at said first and second positions has a substantially equal exposure level;

said device being further responsive to a film speed such that data imprinted at said first and second positions has an exposure level corresponding to said film speed.

17. A camera, having a data imprinting system, comprising:

light emitting elements;

at least one optical element;

said at least one optical element effective for focussing light from said light emitting elements on a surface of a photosensitive film at first and second positions;

a selector;

said selector effective for selecting one of a first frame size and a second frame size;

a masking member;

said masking member effective for framing images having said first and second frame sizes, responsive to said selector;

said first and second positions being associated with said first and second frame sizes respectively;

a controller;

said controller effective for imprinting data on said photosensitive film by selectively illuminating said light emitting elements;

said controller including a modulator;

said modulator effective for modulating said light emitting elements to control amounts of emitted light and thereby an exposure level of said data;

said modulator including a pulse modulator effective for pulse modulating said light emitting elements to vary said amounts of emitted light;

said pulse modulator being responsive to said selector dependent upon a selected frame size such that data imprinted at said first and second positions has a substantially equal exposure level;

an input data line;

said input data line effective for inputting film speed data of said photosensitive film into said controller; and said pulse modulator being further responsive to said film speed data such that data imprinted at said first and second positions has an exposure level corresponding to said film speed.

* * * * *